US007887411B2

(12) United States Patent
Raniere

(10) Patent No.: US 7,887,411 B2
(45) **Date of Patent: *Feb. 15, 2011**

(54) ENTRANCE-EXCHANGE STRUCTURE AND METHOD

(75) Inventor: Keith A. Raniere, Clifton Park, NY (US)

(73) Assignee: First Principles, Inc., Albany, NY (US)

(*) Notice: Subject to any disclaimer, the term of this patent is extended or adjusted under 35 U.S.C. 154(b) by 650 days.

This patent is subject to a terminal disclaimer.

(21) Appl. No.: 11/264,054

(22) Filed: Nov. 1, 2005

(65) Prior Publication Data

US 2006/0052158 A1 Mar. 9, 2006

Related U.S. Application Data

(62) Division of application No. 10/046,101, filed on Jan. 11, 2002.

(51) Int. Cl.
*A63F 9/24* (2006.01)
*A63F 13/00* (2006.01)
*G06F 17/00* (2006.01)

(52) U.S. Cl. ............................. 463/25; 463/16; 463/42; 463/23; 700/231

(58) Field of Classification Search ................... 463/25, 463/16, 42, 23; 700/231
See application file for complete search history.

(56) References Cited

U.S. PATENT DOCUMENTS 5,470,079 A 11/1995 LeStrange et al.
5,876,284 A 3/1999 Acres et al.
5,909,486 A 6/1999 Walker et al.
5,941,772 A 8/1999 Paige
6,003,013 A 12/1999 Boushy et al.
6,014,594 A 1/2000 Heidel et al.
6,511,377 B1 * 1/2003 Weiss .......................... 463/25
2003/0033211 A1 * 2/2003 Haines et al. ................. 705/26
2003/0069071 A1 * 4/2003 Britt et al. ..................... 463/42

OTHER PUBLICATIONS

American Casino Guide—2000 edition Copyright © 2000, Casino Vacations; pp. 16-25, total 7 pages.*

* cited by examiner

*Primary Examiner*—Peter DungBa Vo
*Assistant Examiner*—Frank M Leiva
(74) *Attorney, Agent, or Firm*—Schmeiser, Olsen & Watts, LLP

(57) ABSTRACT

A entrance-exchange structure and method of execution thereof, comprising a house and an activity of uncertain outcome (e.g., game of chance, game of skill, etc.) that is entered by a participant (e.g., a participant such as a player). The house pays the participant a takehome in relevant scrip, or cash and relevant scrip, for an activity entered into by the participant, based on betting by the participant. An existing outside vendor may exchange the participant's scrip at a scrip-to-items exchange rate for at least one item provided by the outside vendor. The outside vendor may exchange the relevant scrip with the house for cash at an outside-vendor scrip-to-cash exchange rate. The house may also function as a vendor with whom the participant may exchange relevant scrip for cash at a house-vendor scrip-to-cash exchange rate. The relevant scrip is a virtual currency that may be generated by the entrance-exchange structure.

10 Claims, 4 Drawing Sheets

FIRST EXAMPLE OF POSITIVE SUM GAME WITH OUTSIDE VENDOR

| PARTY | INVESTMENT CAPITAL | ENDING CAPITAL |
|---|---|---|
| PLAYER | 1000 | 1125 |
| HOUSE | 875 | 1000 |
| OUTSIDE VENDOR | 675 | 875 |
| COMPOSITE | 2550 | 3000 |

FIRST EXAMPLE OF POSITIVE SUM GAME WITH OUTSIDE VENDOR

| PARTY | INVESTMENT CAPITAL | ENDING CAPITAL |
|---|---|---|
| PLAYER | 1000 | 1125 |
| HOUSE | 875 | 1000 |
| OUTSIDE VENDOR | 675 | 875 |
| COMPOSITE | 2550 | 3000 |

*FIG. 3*

SECOND EXAMPLE OF POSITIVE SUM GAME WITH OUTSIDE VENDOR

| PARTY | INVESTMENT CAPITAL | ENDING CAPITAL |
|---|---|---|
| PLAYER | 1000 | 1125 |
| HOUSE | 875 | 1000 |
| OUTSIDE VENDOR | 900 | 875 |
| COMPOSITE | 2775 | 3000 |

*FIG. 4*

FIRST EXAMPLE OF POSITIVE SUM GAME WITH HOUSE VENDOR

| PARTY | INVESTMENT CAPITAL | ENDING CAPITAL |
|---|---|---|
| PLAYER | 1000 | 1125 |
| HOUSE VENDOR | 750 | 1000 |
| COMPOSITE | 1750 | 2125 |

*FIG. 5*

SECOND EXAMPLE OF POSITIVE SUM GAME WITH HOUSE VENDOR

| PARTY | INVESTMENT CAPITAL | ENDING CAPITAL |
|---|---|---|
| PLAYER | 1000 | 1125 |
| HOUSE VENDOR | 1050 | 1000 |
| COMPOSITE | 2050 | 2125 |

*FIG. 6*

ENTRANCE-EXCHANGE STRUCTURE AND METHOD

This application is a divisional of Ser. No. 10/046,101, filed Jan. 11, 2002.

BACKGROUND OF THE INVENTION

1. Technical Field

The present invention relates generally to the field of activities, and in particular, to a entrance-exchange structure and associated method in conjunction with an activity of uncertain outcome.

2. Related Art

In a game of chance such as at a casino, a player of the game competes with the house. The game rules are structured such that the player has a chance of winning the game. The player typically derives satisfaction from the excitement of playing and from not knowing in advance whether the player will win or lose, and from the possibility of winning a large amount of money. The player also derives satisfaction from occasionally winning the game. The game would be enriched for the player, however, if the player could enjoy other satisfactions or advantages from playing the game.

Thus, there is a need for a game-of-chance structure and method that provides the player with new satisfactions or advantages that add to, or replace, the satisfactions that the player currently enjoys from playing the game of chance.

SUMMARY OF THE INVENTION

The present invention provides an entrance-exchange structure, comprising:

scrip; and a game of uncertain outcome adapted to be played by at least one player, wherein a house is adapted to pay a player of the at least one player a takehome in a currency for a win of the game of uncertain outcome by the player based on betting by the player, and wherein the currency is selected from the group consisting of cash plus scrip and scrip.

The present invention provides a method of executing a entrance-exchange structure, comprising:

participating in a game of uncertain outcome by a first party selected from the group consisting of a player and a house, wherein the game of uncertain outcome is being played by the player, wherein a house is adapted to pay the player a takehome in a currency for a win of the game of uncertain outcome by the player based on betting by the player, and wherein the currency is selected from the group consisting of cash plus scrip and scrip; and dealing with the scrip by the first party, wherein if the first party is the player then the dealing by the player comprises receiving from the house the takehome for the win, and wherein if the first party is the house then the dealing by the house comprises giving to the player the takehome for the win.

The present invention provides a virtual currency system, comprising scrip and money, wherein the money is at least one of cash and cash equivalent, wherein the scrip is generated wholly or in part by a entrance-exchange structure, wherein the entrance-exchange structure comprises a game of uncertain outcome adapted to be played by a player, wherein a house is adapted to pay the player a takehome in a currency for a win of the game of uncertain outcome by the player based on betting by the player, and wherein the currency is selected from the group consisting of cash plus scrip and scrip.

The present invention provides an entrance-exchange structure, comprising a scrip-to-items exchange rate $E^{S\rightarrow I}_i$ and a scrip-to-cash exchange rate $E^{S\rightarrow C}_i$, such that i is selected from the group consisting of 1, 2, . . . , and N:

wherein N is at least 1;

wherein a game of uncertain outcome is adapted to be played by a player;

wherein a house is adapted to pay the player a takehome in a currency for a win of the game of uncertain outcome by the player based on betting by the player;

wherein the currency is selected from the group consisting of cash plus scrip and scrip;

wherein N outside vendors exist;

wherein the player may exchange a portion of the scrip with the outside vendor $V_i$ at the scrip-to-items exchange rate $E^{S\rightarrow I}_i$ for at least one item provided by the outside vendor $V_i$ such that i is selected from the group consisting of 1, 2 . . . , and N; and wherein the outside vendor $V_i$ may exchange a percentage of the portion of the scrip for cash at the scrip-to-cash exchange rate $E^{S\rightarrow C}_i$ such that i is selected from the group consisting of 1, 2, . . . , and N.

The present invention provides a method of executing a entrance-exchange structure, comprising dealing with a scrip-to-items exchange rate $E^{S\rightarrow I}_i$ and dealing with a scrip-to-cash exchange rate $E^{S\rightarrow C}_i$, such that i is selected from the group consisting of 1, 2, . . . , and N:

wherein N is at least 1;

wherein a game of uncertain outcome is adapted to be played by a player;

wherein a house is adapted to pay the player a takehome in a currency for a win of the game of uncertain outcome by the player based on betting by the player;

wherein the currency is selected from the group consisting of cash plus scrip and scrip;

wherein N outside vendors exist;

wherein dealing with the scrip-to-items exchange rate $E^{S\rightarrow C}_i$ comprises permitting, by outside vendor $V_i$, the player to exchange a portion of the scrip with the outside vendor $V_i$ at the scrip-to-items exchange rate $E^{S\rightarrow I}_i$ for at least one item provided by the outside vendor $V_i$ such that i is selected from the group consisting of 1, 2, . . . , and N; and wherein dealing with the scrip-to-cash exchange rate $E^{S\rightarrow C}_i$ comprises exchanging a percentage of the portion of scrip from the outside vendor $V_i$ for cash at the scrip-to -cash exchange rate $E^{S\rightarrow C}_i$ such that i is selected from the group consisting of 1, 2, . . . , and N.

The present invention provides an entrance-exchange structure, comprising:

scrip; and an activity of uncertain outcome adapted for at least one participant, wherein a house is adapted to pay a participant of the at least one participant a takehome in a currency for at least one potential outcome of the activity of uncertain outcome, based on entrance by the participant in relation to the activity, and wherein the currency is selected from the group consisting of cash plus scrip and scrip.

The present invention advantageously provides a entrance-exchange structure that provides the player with new satisfactions or advantages that add to, or replace, the satisfactions that the player currently enjoys from playing an activity of uncertain outcome (e.g., a game of uncertain outcome). For example, the entrance-exchange structure may be configured so that the player is, on the average, able to advantageously convert a given amount of cash into relevant scrip and then redeem the relevant scrip for items (e.g., goods, merchandise, real property, different scrip, etc.) from a vendor, wherein the items have a greater monetary value than does the given amount of cash.

The entrance-exchange structure of the present invention advantageously enables the house to be profitable while providing said satisfactions to the player.

The entrance-exchange structure of the present invention advantageously generates a virtual currency in the form of the scrip, wherein the virtual currency conveniently facilitates the redemption of the items from the vendor.

The activity of uncertain outcome of the present invention may advantageously be a positive-sum game.

BRIEF DESCRIPTION OF THE DRAWINGS

FIG. 3 is a table illustrating a first example of a positive sum game with an outside vendor, in accordance with embodiments of the present invention.

FIG. 4 is a table illustrating a second example of a positive sum game with an outside vendor, in accordance with embodiments of the present invention.

FIG. 5 is a table illustrating a first example of a positive sum game with a house vendor, in accordance with embodiments of the present invention.

FIG. 6 is a table illustrating a second example of a positive sum game with a house vendor, in accordance with embodiments of the present invention.

DETAILED DESCRIPTION OF THE INVENTION

Figure 1:
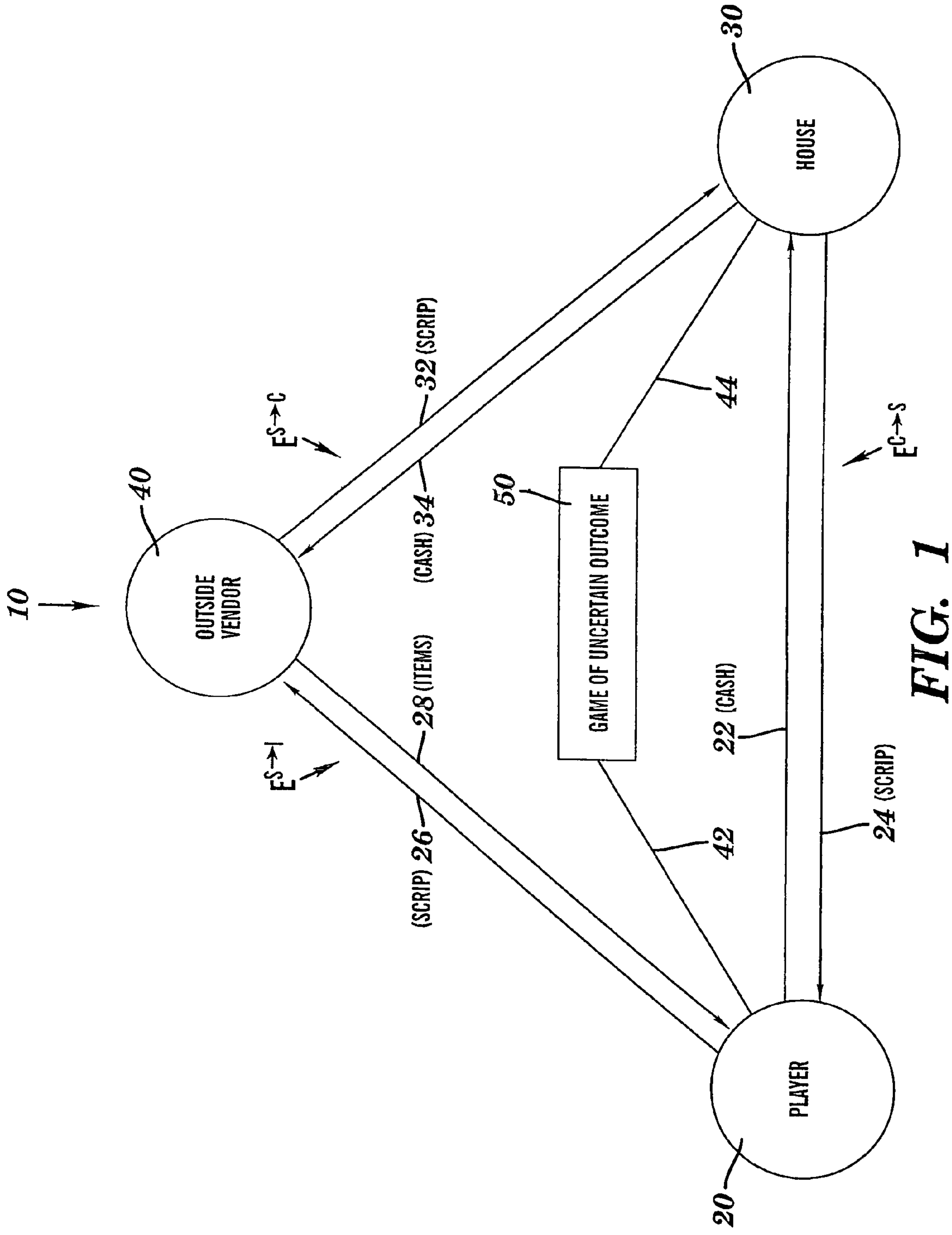
FIG. 1 depicts a entrance-exchange structure with a player, a house, and an outside vendor, in accordance with embodiments of the present invention.

In a conventional game of uncertain outcome, a player of the game may receive an expected net payoff of X dollars for each dollar bet, wherein X depends on the "odds" (e.g., the probability of winning the game). For example, X=0.95 means that the player receives an expected net payoff of 95 cents for each dollar bet. Note that the betting establishment is also called the "house." The words "dollar" and "cent" are each used herein generically to represent any recognized cash currency such as the American dollar, American cent, Japanese yen, English pound, etc. Similarly, the words "cash" stands for any recognized cash currency such as the American dollar, American cent, Japanese yen, English pound, etc.

With the present invention, the player receives an expected net payoff of C dollars of cash and S units of relevant scrip for each dollar bet such that $0 \leqq C \leqq 1$ and $S>0$. "Relevant scrip" is defined herein a scrip that is relevant to the situation or purpose being described, since as will be explained infra the present invention describes many different types of scrip (bettable scrip, non-bettable scrip, conditional scrip, unconditional scrip, etc.), and for the situation described above, the S units of relevant scrip may comprise some types of scrip but not other types of scrip. In general unless stated otherwise, the word "scrip" is understood herein to mean "relevant scrip." The case of C=1 may be relevant when, inter alia, the house has decided to give the player free relevant scrip and thus executes returning to the player the same amount of cash that the player actually bets. S embodies a "virtual currency" that is exchangeable for items (e.g., goods, services, real property, different scrip, etc.) at various outside vendors, or is exchangeable for items from the house if the house functions as a house vendor, or both. The term "takehome" denotes a net amount (e.g., C and S combined) for each dollar bet that the player takes away after any house commission has been deducted from the payout or separately paid by the player. Generally, "takehome" is the actual amount of currency received from the game after subtracting all commissions, fees and payments owed to a player from entering and playing the game (see infra for a formal definition of "entering"). For example, if a player bets one dollar and wins, and if for the dollar bet the cash payout is 90 cents, the house cash commission is 5 cents, the scrip payout is 20 cents, and the house scrip commission is 1 cent, then the player actually receives a takehome (after house commissions have been deducted or paid) of 85 cents in cash and 19 cents in relevant scrip.

For purposes of clarity, the term "outside vendor" denotes a vendor who is not the house, the term "house vendor" denotes a vendor who is also the house, and the generic term "vendor" denotes either an outside vendor or a house vendor. There must be at least one vendor, which means that a house vendor exists, at least one outside vendor exists, or both a house vendor and at least one outside vendor exist. Thus if there are N outside vendors, then the house may be the only vendor such that N=0, the house may be a vendor along with the N outside vendors such that $N \geqq 1$, or the house may not be a vendor and the N outside vendors exist such that $N \geqq 1$.

Examples of goods include, inter alia, food, liquor, automobiles, appliances, clothing and jewelry. Examples of services include, inter alia, entertainment, lodging, travel, spa usage, Internet rights, and telephone usage. Examples of real property include, inter alia, a parcel of land, a residential building, and a commercial building. If an outside vendor exists, then said outside vendor may have a relationship with the house such that the outside vendor permits the holder of the relevant scrip to use the relevant scrip to purchase items offered for sale by the outside vendor, provided that the player is using relevant scrip to purchase items from the vendor. The scrip is "relevant" for use with a given outside vendor if the scrip may be used to purchase items from the given vendor. Note that some relevant scrip may be used only at certain vendors or in accordance with certain conditions, as will be discussed infra, and is thus not necessarily relevant.

If a house vendor exists, then the house has agreed to permit the holder of the relevant scrip to use a relevant portion of the relevant scrip to purchase items from the house. Note that a player of the game can bet with cash (or cash equivalent such as gaming tokens, chips, credit card, ATM card, etc.), relevant scrip (e.g., bettable scrip), etc. The bettable scrip may be absolutely bettable or conditionally bettable. The conditionally bettable scrip is bettable if a condition is satisfied. The condition may comprise, inter alia, a vendor-dependent condition (e.g., the outside vendor must be an outside vendor A or an outside vendor B), a time-dependent condition (e.g., the bettable scrip is bettable only between date A and date B such as between Dec. 31, 2001 and Apr. 30, 2002), or a game-dependent condition (e.g., the bettable scrip must have resulted from winning a roulette game; the bettable scrip can be wagered at only a specific game such as roulette or a slot machine), etc. Note that the scope of the present invention also includes relevant scrip that is non-bettable.

C and S do not represent a takehome in an individual game, since a player of the game does not necessarily win each game that the player participates in. For each 100 games played, the player will win, on the average, 100P games where P is the probability of winning each individual game of the 100 games. Note that the 100 games may not be the same type of game. For example, some of the 100 games may be Black- Jack, other games may be Craps, and still other games may be Roulette. In the more general case in which the probability of winning an. individual game varies (i.e., P is not constant), P is an average probability; e.g., P is $\Sigma_i/100$ in the preceding example, wherein $\Sigma_i$ is a summation of $P_i$ from i=1 to i=100, and wherein $P_i$ is the probability of winning game i (i=1, 2, . . . , 100). As an example, assume that. P has a constant value of 0.10, and that a player receives a takehome of $8 in cash and 2.50 in relevant scrip units for each $1 bet in each game that the player actually wins. If the player starts playing with betting capital of $1000 and bets $100 in each game, then on the average the player will win 1 out of 10 games played and when the player wins, the player will receive $800 in cash and 250 units of relevant scrip as a return on the $100 winning bet. In the 10 games played, on the average the player will lose $900 in the 9 of the 10 games and will win $800 in cash and 250 units of relevant scrip in 1 of the 10 games. In this example, C=0.80 and S=0.25 based on the 9 losing games and on the 1 winning game for the cumulative $1000 of money bet in the 10 games (i.e., C=800/1000 and S=250/1000). The preceding scenario is mathematically equivalent to a situation in which the player always wins (e.g., in every game played) and receives a takehome of $0.80 (i.e., 80 cents) in cash and 0.25 unit of relevant scrip for each dollar bet in each game played. Thus C and S, which are defined as expected average values that result from given winning probabilities P or $P_i$, could be mathematically simulated by assuming that the player win in every game and that C and S is returned to the player for each dollar bet in every game.

The following example illustrates several aspects of the present invention. Consider a game of uncertain outcome at a house, wherein the probability of winning and the takehomes to game players are structured such that C=0.80 and S=0.25. For simplicity, assume the mathematical model in which the player wins every game and receives $0.80 in cash and 0.25 units of relevant scrip for each $1 of cash bet. Further assume that the relevant scrip is not bettable. As explained supra, this mathematical model is equivalent to the more general case in which the probability of winning an individual game is less than or equal to 1. Each such game may be viewed as an iteration of a mathematical sequence, as follows. Assuming that the player starts betting with $1000 and bets with the available dollars of rebettable currency at each iteration, the player will bet the $1000 at the first iteration and receive a return of $800 in cash and 250 v of relevant scrip, since 0.80×1000=800 and 0.25×1000=250. The symbol "v" denotes a unit of virtual currency or, equivalently, a unit of relevant scrip. At the second iteration, the player bets the $800 of cash and receives a return of $640 in cash and 200 v of relevant scrip, since 0.80×800=640 and 0.25×800=200. At the third iteration, the player bets the $640 of cash and receive a return of $512 in cash and 160 v of relevant scrip, since 0.80×640=512 and 0.25×640=160. The iterations form a geometrical series which converges to the result of zero dollars of cash and 1250 v units of relevant scrip. Generally, if the player starts betting with D dollars of cash (D=$1000 in the preceding example) and bets in accordance with the geometric series described supra, then the player will end up with zero dollars of cash and D×L units of relevant scrip, wherein L is called a "limiting scrip takehome" and is calculated according to L S/(1−C) if C/S is constant. Thus in the preceding example of sequential betting, L=1.25 (i.e., 0.25/(1−0.80)) and D×L=1250 v (i.e.,1000×1.25). Thus, the preceding example illustrates that the expected return to the player (i.e., 1250 v relevant scrip) may exceed the initial betting capital of the player (i.e., $1000) depending on the exchange rate between cash and scrip as will be discussed infra.

The limiting scrip takehome in the preceding example assumes that C/S is constant and that S is completely non-bettable, which represent simplifications that may not always apply. For example, C and S may vary with the type of game played, S may be wholly or partially bettable, and/or C/S may be iteration-dependent during a betting sequence in which the player varies the type of game played or plays a single game in which C/S varies: with time, with iteration, randomly, or with other circumstance. Thus, the limiting scrip takehome L may differ from S/(1−C) if C/S is not constant.

In the preceding example, the player started with $1000 in cash and ended up with 1250 v of relevant scrip. The player can redeem the relevant scrip at any vendor that exists (e.g., an outside vendor that exists or a house vendor that exists). An outside vendor may permit the holder of the relevant scrip to use the relevant scrip to purchase items offered for sale by the outside vendor at a scrip-to-items exchange rate $E^{S\rightarrow I}$, wherein $E^{S\rightarrow I}$ is a dollar value of 1 unit of relevant scrip when the relevant scrip is used to purchase items offered for sale by the outside vendor at retail value (e.g., at a market price that a willing buyer would pay for the item(s)). As a first example, if $E^{S\rightarrow I}$=1.10 at a given outside vendor then the 1250 v of relevant scrip has a dollar value of $1375 (i.e., 1.10×1250) for purchasing items offered for sale by the given outside vendor. As a second example, if $E^{S\rightarrow I}$=1.00 at a given outside vendor then the 1250 v of relevant scrip has a dollar value of $1250 (i.e., 1.00×1250) for purchasing items offered for sale by the given outside vendor. As a third example, if $E^{S\rightarrow I}$=0.90 at a given outside vendor then the 1250 v of relevant scrip has a dollar value of $1125 (i.e., 0.90×1250) for purchasing items offered for sale by the given outside vendor. As a fourth example, if $E^{S\rightarrow I}$=0.80 at a given outside vendor then the 1250 v of relevant scrip has a dollar value of $1000 (i.e., 0.80×1250) for purchasing items offered for sale by the given outside vendor. As a fifth example, if $E^{S\rightarrow I}$0.70 at a given outside vendor then the 1250 v of relevant scrip has a dollar value of $875 (i.e., 0.70×1250) for purchasing items offered for sale by the given outside vendor. In the preceding examples, the game of uncertain outcome is "profitable" for the player if $E^{S\rightarrow I}$>0.80 and is "unprofitable" for the player if $E^{S\rightarrow I}$<0.80, but is neither profitable nor unprofitable for the player if $E^{S\rightarrow I}$=0.80.

A house vendor may permit the holder of the relevant scrip to use the relevant scrip to acquire items from the house at a scrip-to-items exchange rate $E^{S\rightarrow I}_0$, wherein $E^{S\rightarrow I}_0$ is a dollar value of 1 unit of relevant scrip when the relevant scrip is used to acquire items from the house at retail value (e.g., at a market price that a willing buyer would pay for the item(s)). The preceding five examples involving an outside-vendor with the associated scrip-to-items exchange rate $E^{S\rightarrow I}$ are applicable to a house vendor with the associated scrip-to-items exchange rate $E^{S\rightarrow I}_0$, wherein $E^{S\rightarrow I}_0$ is analogous to $E^{S\rightarrow I}$.

In general, $E^{S\rightarrow I}$ may be outside vendor-dependent, since different outside vendors may have a different relationships with the house. For example, a relationship between a first outside vendor and the house may be independent of a relationship between a second outside vendor and the house. Thus if there are N outside vendors (N≧1) who have relationships with the house, then the scrip-to-items exchange rate for outside vendor $V_i$ may be $E^{S\rightarrow I}_i$, wherein S units of relevant scrip is worth $C_i$ dollars of cash if used to purchase items from the outside vendor $V_i$, and wherein $C_i$=S $E^{S\rightarrow I}_i$ (i=1, 2, . . . , N). If the expected takehome for each dollar bet is C dollars and S units of relevant scrip, then the "value" of the expected takehome associated with outside vendor $V_i$ is C+$C_i$. Since $C_i$=S $E^{S\rightarrow I}_i$, the quantity C+$C_i$ is equal to C+S $E^{S \to I}_i$, and $C+C_i$ represents the "expected return" to the player in relation to outside vendor $V_i$. Thus, the expected return in relation to outside vendor $V_i$ is "profitable" to the player if $C+C_i>1$, and is unprofitable to the player if $C+C_i<1$. Generally, the game of uncertain outcome may be profitable to the player for some outside vendors and unprofitable for other outside vendors. As a special case, relationships between outside vendors and the house may exist such that the expected return to the player is profitable to the player for all outside vendors (i.e., $C+C_i>1$ each i of i=1, 2, . . . , N).

The are various types of such relationships between an outside vendor and the house. For example, a given outside vendor and the house may have a contractual relationship that establishes the scrip-to-items exchange rate associated with the given outside vendor. As another example, an outside vendor may be a third-party vendor that has no contractual relationship with the house. The house may be unaware of the existence of the third-party vendor, and the third -party vendor may be unaware of the existence of the house. The third-party vendor may be willing to exchange relevant scrip for items that the third-party vendor possesses or has access to. The third-party vendor may have no relationship with the house having to do with exchanging relevant scrip for items, and the third-party vendor may have no relationship with the house that would require the house to exchange for cash relevant scrip possessed by the third-party vendor. Thus the third-party vendor is independent of the house and operates within the framework of a virtual currency system (to be described infra) such that the third party vendor may exchange relevant scrip for cash, cash for relevant scrip, items for relevant scrip, and/or relevant scrip for items, or relevant scrip for different relevant scrip.

For a house vendor, S units of relevant scrip is worth $C_0$ dollars of cash if used to acquire items from the house. If the expected takehome for each dollar bet is C dollars and S units of relevant scrip, then the "value" of the expected takehome associated with house vendor is $C+C_0$. Since $C_0=S\,E^{S \to I}_0$, the quantity $C+C_0$ is equal to $C+S\,E^{S \to I}_0$, and $C+C_0$ represents the "expected return" to the player in relation to house vendor. Thus, the expected return in relation to the house vendor is "profitable" to the player if $C+C_0>1$, and is unprofitable to the player if $C+C_0<1$. As a first special case, the house may structure the entrance-exchange structure such that: the expected return in relation to the house vendor is profitable to the player; and the expected return in relation to outside vendors is profitable to the player for each outside vendor that exists. As a second special case, the house may structure the entrance-exchange structure such that: the expected return in relation to the house vendor is unprofitable to the player; and the expected return in relation to outside vendors is profitable to the player for each outside vendor that exists. As a third special case, the house may structure the entrance-exchange structure such that: the expected return in relation to the house vendor is profitable to the player; and the expected return in relation to N existing outside vendors is profitable to the player for each of M outside vendors such that $0 \leqq M<N$ and $N \geqq 1$. As a fourth special case, the house may structure the entrance-exchange structure such that: the expected return in relation to the house vendor is unprofitable to the player; and the expected return in relation to N existing outside vendors is profitable to the player for each of M outside vendors such that $0 \leqq M<N$ and $N \geqq 1$.

Simplification (especially for the holder of the relevant scrip) would be gained if $E^{S \to I}$ has a constant value K (e.g., K=1.10) independent of outside vendor, and additional simplification would be gained if K=1. For the special case of $E^{S \to I}=K=1$, S units of relevant scrip is worth exactly S dollars if used to purchase items (e.g., goods, services, real property, etc.) offered for sale by the outside vendor. Said simplification of having $E^{S \to I}$ equal to the constant value K may be at the expense of having relationships between individual outside vendors and the house tailored to the needs and requirements of individual outside vendors. Accordingly, the scope of the present invention includes both cases: i.e., the case in which $E^{S \to I}$ is variable and outside vendor dependent, and the case in which $E^{S \to I}$ is constant and outside vendor independent.

An outside vendor $V_i$ who acquires relevant scrip in the aforementioned manner may redeem the relevant scrip from the house for dollars of cash in accordance with a scrip-to-cash exchange rate $E^{S \to C}_i$, wherein each unit of relevant scrip may be redeemed for $E^{S \to C}_i$ dollars of cash. Thus if $E^{S \to C}_i=0.70$, then 1250 v of relevant scrip could be redeemed by the outside vendor $V_i$ for \$875 (i.e., 0.70×1250).

As an example of how the present invention may benefit the player, house, and outside vendor, assume as before that C=0.80 and S=0.25, and that the player starts betting with \$1000 and converts the \$1000 to 1250 v of relevant scrip based on the limiting scrip takehome L of 1.25. If $E^{S \to I}_i=0.90$ for the outside vendor $V_i$, then the player redeems the 1250 v relevant scrip for \$1125 (i.e., 0.90×1250) of items (e.g., goods, services, real property, etc.) from the outside vendor $V_i$ and thus gains \$125 on the \$1000 investment, which represents a 12.5% return on the \$1000 investment. If $E^{S \to C}_i=0.70$ for the outside vendor $V_i$, then the outside vendor $V_i$ redeems the 1250 v relevant scrip, which the outside vendor received from the player, for \$875 (i.e., 0.70×1250) from the house. If the outside vendor $V_i$ paid a wholesale price of \$675 for the item(s) sold to the player, which represents a 66.7% markup to the retail price of \$1125, then the outside vendor $V_i$ achieves a profit of \$200 (i.e., \$875−\$675), which represents a percent profit of 29.6% (i.e., 100×200/675). Thus the fractional markup $U_i$ from wholesale price to retail price for outside vendor $V_i$ is 0.667 (i.e., (1125−675)/675)), wherein $U_i$ is defined as (retail price—wholesale price)/wholesale price. Lastly, the house received \$1000 from the player and returned \$875 to the outside vendor $V_i$ for a dollar profit of \$125 and a percent profit of 14.3% (i.e., \$125/\$875) for the house. Thus, the present invention may be beneficial to all parties: the player, the house, and the outside vendor, as illustrated in FIG. 3 which will be described infra.

Since the fractional markup $U_i$ from wholesale price to retail price may vary among outside vendors, especially among outside vendors of different industries or markets, an outside vendor-dependence of $E^{S \to I}_i$ and $E^{S \to C}_i$ on outside vendor $V_i$ provides flexibility that enables all outside vendors to profit from the present invention. For example, agreements, if any, between the house and outside vendors may be individually negotiated between the house and the outside vendors to arrive at bargained-for values of $E^{S \to I}_i$ and $E^{S \to C}_i$ for each outside vendor $V_i$ (i=1, 2, . . . , N).

As stated supra, the scope of the present invention also includes the possibility that the house functions as a vendor (i.e., the house is a house vendor) by acquiring a capability to provide items (e.g., goods, services, real property, etc.) to the player in exchange for relevant scrip at a scrip-to-items exchange rate $E^{S \to I}_0$, which is analogous to the scrip-to -items exchange rate $E^{S \to I}_i$ relating to the outside vendors $V_i$ as discussed supra. See FIG. 2, to be described infra, for a depiction of the house in the role of a house vendor. For example, the house may purchase the goods at a bargained-for price and thus have such items available to be exchanged for relevant scrip by the player. The bargained-for price may be lower than the market price for an item; e.g., the house may purchase items in bulk quantities and thus bargain for a discount due to the bulk purchase. Accordingly, a fractional markup $U_0$ can be defined for the house vendor, wherein $U_0$ is calculated as a fractional increase from said bargained-for price actually paid by the house vendor to the retail value (e.g., market price) of a single item. The house vendor can exploit $U_0$ in various ways such as, inter alia, using $U_0$ to generate or increase profitability in relation to paying the player relevant scrip, or relevant scrip plus cash, when the player wins the game of uncertain outcome. The house may also exploit $U_0$ by manufacturing items which may be exchanged for relevant scrip; e.g., said manufacturing of items avoids a middleman which increases profitability for the house.

To illustrate an advantage of the present invention when the house functions as a house vendor, consider the previous example of assuming as before that C=0.80 and S=0.25, and that the player starts betting with $1000 and converts the $1000 to 1250 v of relevant scrip based on the limiting scrip takehome L of 1.25. If $E^{S \to I}_0$=0.90 for the house vendor, then the player redeems the 1250 v relevant scrip for $1125 (i.e., 0.90×1250) of items (goods, services, real property, different scrip, etc.) from the house vendor and thus gains $125 on the $1000 investment, which represents a 12.5% return on the $1000 investment. If the fractional markup $U_0$ is 0.50 (i.e., 50% markup), then the house vendor has paid $750 for the $1125 retail value of the items redeemable to the player with the 1250 v of relevant scrip. Since the house received $1000 from the player and paid only $750 for the items redeemed to the player by the house, the house realize a dollar profit of $250 and a percent profit of 33.3% (i.e., $250/$750). Thus, the present invention is beneficial to both the player and the house when the house functions as a house vendor.

FIG. 1 depicts a entrance-exchange structure 10, as described supra, in accordance with embodiments of the present invention. The word "exchange" in "entrance-exchange" denotes any of the exchanges of the present invention such as exchanges between relevant scrip and cash, cash and items, etc. The entrance-exchange structure 10 includes a house 30, a player 20, an outside vendor 40, and a game of uncertain outcome 50. The scope of the present invention includes the case in which the outside vendor 40 exists, as well as the case in which the outside vendor 40 does not exist.

The game of uncertain outcome 50 comprises at least one of: a game of chance and a game of skill, or a combination thereof. A game of chance may include, inter alia: a casino game such as Black-Jack, Craps, Roulette, or a slot machine; horse racing; dog racing; a card game such as poker; a sporting event such as football; a lottery; etc. A game of skill in the context of the game of uncertain outcome 50 may include, inter alia: a game of chess, a-card game of skill such as bridge, a game in which the player 20 is required to correctly solve a mathematical problem in a given amount of time; a game in which the player 20 is required to drive a golf ball at least a given distance; a competitive carnival game; billiards; darts; pool; a sporting event such as swimming, basketball, skeet ball; a track competition in which the winner runs a given distance in less time than the other competing players; a game in which the player 20 is required to correctly answer multiple choice questions on any topic (e.g., music, economics, language, movie stars, sports heroes, geography, etc.); testing the result of completely learning a task; etc. For the present invention, a "contest" is within the scope of "game" in a game of uncertain outcome. For example, several fishermen may compete in a contest, wherein the winner of the contest is the fisherman who catches the largest number of fish within a given time interval on a given date.

The player 20 stands for at least one player who, in playing the game of uncertain outcome 50, may be engaged in betting or in another activity subject to an uncertain outcome. The game of uncertain outcome may include one or more other of such players 20. Each such player 20 may be a person, an entity (e.g., an organization such as a corporation, church), etc.

The house 30 may comprise a casino (e.g., a conventional casino, a computer casino), a race track, an person, a plurality of persons, a business entity (e.g., a corporation), etc. Note that a computer casino may include use of an Internet and/or Intranet. The player 20 may interact with the computer casino over a data communication medium such as, inter alia, an Internet, an Intranet, a cable television network, a telephone network, a wide area network, a satellite network, a short wave radio network, or a combination thereof. The player 20 interacts with the house 30 by engaging in entering (e.g., wagering) 42 in the game of uncertain outcome 50, and by the house 30 engaging in management 44 of the game of uncertain outcome 50. The scope of "network" in the preceding list of data communication media include, inter alia, a system of interconnected nodes, two directly-connected nodes or locations; etc. Such engaging in management 44 of the game of uncertain outcome 50 may include establishing the game of uncertain outcome 50 and the rules thereof, executing the game of uncertain outcome 50, exchanging money of the player 20 for chips for playing the game of uncertain outcome 50, etc. The scope of the house includes, inter alia, employees of the house, independent contractors with the house, physical facilities of the house, etc.

The outside vendor 40 stands for N outside vendors of any type (e.g., vendors in a contractual relationship with the house; vendors exchanging relevant scrip, items, and/or cash with the house; third-party vendors; combinations thereof; etc.), wherein N≧0 (i.e., the outside vendor 40 stands for outside vendor $V_i$ for i=1, 2, . . . , N). Additionally, a house vendor may exist (e.g., if N=0). Each such outside vendor 40 sells items (e.g., goods, services, real property, different scrip, etc.), and each such outside vendor 40 may have a relationship with the house 30 as described supra. The outside vendor 40 may comprise any person, broker, merchant, business entity, the house 30, etc. As a special case, two or more outside vendors 40 may be such as to not provide a same or essentially similar item or items in exchange for the relevant scrip. This special case may serve as an inducement for outside vendors 40 to participate in the entrance -exchange structure 10, since such outside vendors 40 do not have to face competition against other outside vendors within the framework of the entrance-exchange structure 10.

The player 20 and outside vendor 40 exchange relevant scrip 26 for items 28 (e.g., goods, services, real property, different scrip, etc.) at a scrip-to-items exchange rate $E^{S \to I}$ as described supra. The outside vendor 40 and the house 30 may exchange relevant scrip 32 for cash 34 at a scrip-to-cash exchange rate $E^{S \to C}$ as described supra. Other exchanges with and amongst outside vendors (e.g., third-party vendors) may occur such as, inter alia, items for relevant scrip, relevant scrip for items, etc.

An embodiment of the present invention is a cash-to-scrip exchange mechanism $E^{C \to S}$ in which a player of the game of uncertain outcome 50 receives a takehome in relevant scrip, or cash and relevant scrip, and in which the initial cash of the player 20 may be converted to relevant scrip in the form of the limiting scrip takehome, or alternatively more or less than the limiting scrip takehome.

Figure 2:
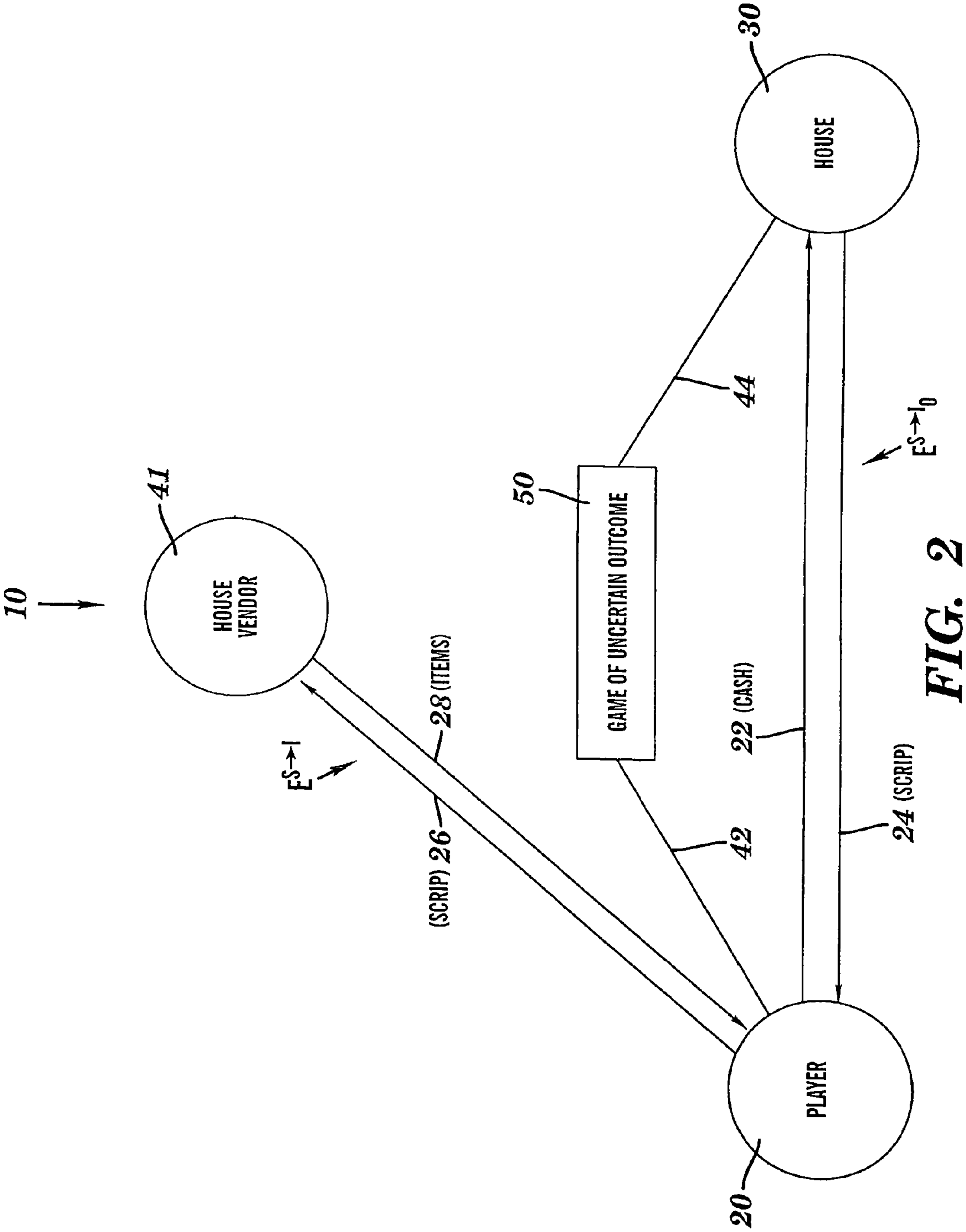
FIG. 2 depicts a entrance-exchange structure with a player and a house such that the house also functions as a house vendor, in accordance with embodiments of the present invention.

If there are no outside vendors 40 (i.e., if N=0), then a house vendor must exist, as explained supra, and FIG. 1 is replaced by FIG. 2 in accordance with embodiments of the present invention. In FIG. 2, the house 20 is also represented as the house vendor 41, which demonstrates the dual role of house 20 as a provider of the game of uncertain outcome and as a vendor. Generally, the vendors of the present invention may comprise one or more outside vendor 40 of FIG. 1, the house vendor 41 of FIG. 2, or both.

Based on FIG. 1, FIG. 2, and on the examples discussed supra, various definitions and relationships of the present invention are as follows.

C=units of cash

S=units of relevant scrip

N=number of outside vendors, wherein $N \geqq 0$.

$V_i$=$i^{th}$ outside vendor(i=1, 2, . . . , N)

$E^{S\rightarrow I}_i$=scrip-to-items exchange rate for outside vendor $V_i$ (for items provided by outside vendor $V_i$ in exchange for relevant scrip)

$E^{S\rightarrow I}_0$=scrip-to-items exchange rate for house vendor (for items provided by a house vendor in exchange for relevant scrip)

$E^{S\rightarrow C}_i$=scrip-to-cash exchange rate for outside vendor $V_i$ (for cash provided by the house to an outside vendor $V_i$ in exchange for relevant scrip)

$E^{S\rightarrow C}_0$=scrip-to-cash exchange rate for house vendor (for cash provided by a house vendor in exchange for relevant scrip)

L=limiting scrip takehome (equal to S/(1−C) if C/S if is constant)

$U_i$=fractional markup from wholesale to retail for outside vendor $V_i$ $U_0$=fractional markup for the house vendor; e.g., fractional increase from bargained -for price to market price or fractional increase from manufacturing items by house vendor $\Phi_{P,i}$=percent profit for the player 20 in relation to the outside vendor $V_i$ $=100\times(LE^{S\rightarrow I}_i-1)$ $\Phi_{P,0}$=percent profit for the player 20 in relation to the house vendor $=100\times(LE^{S\rightarrow I}_0-1)$ $\Phi_{V,i}$=percent profit for the outside vendor $V_i$ $=100\times[(1+U_i)E^{S\rightarrow C}_i/E^{S\rightarrow I}_i-1]$ $\Phi_{H,i}$=percent profit for the house 30 in relation to the outside vendor $V_i$ $=100\times[(1/(LE^{S\rightarrow C}_i)-1]$ $\Phi_{H,0}$=percent profit for the house 30 when functioning as a house vendor $=100\times[\{(1+U_0)/LE^{S\rightarrow I}_0)\}-1]$ As a first check on the preceding formulas for the outside vendor example, discussed supra, of L=1.25, $E^{S\rightarrow I}_i$=0.90, $E^{S\rightarrow C}_i$=0.70, $U_i$=⅔=0.667, the percent profits are: $\Phi_{P,i}$=12.5%, $\Phi_{V,i}$=29.7%, $\Phi_{H,i}$=14.3%. As a second check on the preceding formulas for the house vendor example, discussed supra, of L=1.25, $E^{S\rightarrow I}_0$=0.90, $U_0$=0.50, the percent profits are: $\Phi_{P,0}$=12.5% and $\Phi_{H,0}$=33.3%.

Based on the preceding definitions, the entrance-exchange structure 10 is profitable for the player 20 in relation to outside vendor $V_i$ if $\Phi_{P,i}>0$. The entrance -exchange structure 10 is profitable for the player 20 in relation to the house 30 if $\Phi_{P,0}>0$. The entrance-exchange structure 10 is profitable for the outside vendor $V_i$ if $\Phi_{V,i}>0$. The entrance-exchange structure 10 is profitable for the house 30 in relation to the outside vendor $V_i$ if $\Phi_{H,i}>0$. The entrance-exchange structure 10 is profitable for the house 30 when the house 30 functions as a house vendor $V_i$ if $\Phi_{H,0}>0$.

The game of uncertain outcome of the present invention is a "positive sum game" in relation to at least one outside vendors if the composite investment of the player, the house, and the at least one outside vendor increases. Thus the positive sum game is defined in relation to a given group of outside vendors such as: in relation to one specified outside vendor, in relation to all outside vendors, or in relation to a specified group of outside vendors. For example, if three outside vendors $V_1$, $V_2$, and $V_3$ exist, then the game of uncertain outcome is a positive sum game: 1) in relation to $V_1$ if the composite investment of the player, the house, and $V_1$ increases; 2) in relation to $V_1$ and $V_2$ if the composite investment of the player, the house, $V_1$, and $V_2$ increases; 3) in relation to $V_1$, $V_2$, and $V_3$ if the composite investment of the player, the house, $V_1$, $V_2$, and $V_3$ increases. An example of a positive sum game with one outside vendor, described supra, is shown in FIG. 3. The example of FIG. 3 illustrates a positive sum game because the composite Investment Capital of the player the house, and the outside vendor is increased (i.e., from $2550 to $3000).

FIG. 3 also illustrates the game of uncertain outcome relating to a "positive participant game" in relation to the outside vendor $V_i$. Generally, the positive participant is profitable to each participant, namely the player, the house, and at least one outside vendor. Thus the positive participant game is defined in relation to a given group of outside vendors such as: in relation to one specified outside vendor, in relation to all outside vendors, or in relation to a specified group of outside vendors. For example, if three outside vendors $V_1$, $V_2$, and $V_3$ exist, then the game of uncertain outcome is a positive participant game: 1) in relation to $V_1$ if the investment of each of the player, the house, and $V_1$ increases; 2) in relation to $V_1$ and $V_2$ if the investment of each of the player, the house, $V_1$, and $V_2$ increases; 3) in relation to $V_1$, $V_2$, and $V_3$ if the investment of each of the player, the house, $V_1$, $V_2$, and $V_3$ increases. Mathematically, a positive participant game in relation to an outside vendor $V_i$ is characterized by: $\Phi_{P,i}>0$, $\Phi_{H,i}>0$, and $\Phi_{V,i}>0$. In FIG. 3, the positive participant game is demonstrated by the fact that the Ending Capital exceeds the Investment Capital for each of the player, the house, and the outside vendor. Thus, the entrance-exchange structure 10 may be profitable for each of the player, the house 30, and the outside vendor $V_i$.

A positive participant game is a special case of a positive sum game. Thus, a positive sum game may not be a positive participant game as illustrated in FIG. 4 in relation to an outside vendor, but a positive participant game must be a positive sum game as illustrated in FIG. 3 in relation to the outside vendor. The example of FIG. 4, although a positive sum game, is not a positive participant game because the Ending Capital of the Outside Vendor ($875) does not exceed the Investment Capital of the Outside Vendor ($900) even though there was a 25% markup (i.e., 100×(1125−900)900) for the item(s) of the example of FIG. 4.

The scope of the present invention includes cases in which any two of $\Phi_{P,i}$, $\Phi_{H,i}$, and $\Phi_{V,i}$ are each positive such that a remaining one of $\Phi_{P,i}$, $\Phi_{H,i}$, $\Phi_{V,i}$ is not positive. The scope of the present invention also includes cases in which any one of $\Phi_{P,i}$, $\Phi_{H,i}$, and $\Phi_{V,i}$ is positive such that a remaining two of $\Phi_{P,i}$, $\Phi_{H,i}$, and $\Phi_{V,i}$ are each not positive. The scope of the present invention further includes cases in which each of $\Phi_{P,i}$, $\Phi_{H,i}$, and $\Phi_{V,i}$ is positive.

The game of uncertain outcome of the present invention is a positive sum game in relation to the house vendor if the composite investment of the player and the house increases. An example with a house vendor, described supra, is a positive sum game as shown in FIG. 5. The example of FIG. 5 illustrates a positive sum game because the composite Investment Capital is increased (i.e., from $1750 to $2125). FIG. 5 also illustrates the game of uncertain outcome relating to a "positive participant game" in relation to the house vendor. As stated supra, in a positive participant game, the game is profitable to the each participant, namely the player and the house vendor. Mathematically, a positive participant game with a house vendor is characterized by: $\Phi_{P,0}>0$ and $\Phi_{H,0}>0$. In FIG. 5, the positive participant game is demonstrated by the fact that the Ending Capital exceeds the Investment Capital for each of the player and the house vendor. Thus, the entrance-exchange structure 10 may be profitable for both the player and the house 30 when the house 30 functions as a house vendor.

As explained supra, a positive participant game is a special case of a positive sum game. Thus, a positive sum game may not be a positive participant game as illustrated in FIG. 6 in relation to a house vendor, but a positive participant game must be a positive sum game as illustrated in FIG. 5 in relation to the house vendor. The example of FIG. 6, although a positive sum game, is not a positive participant game, because the Ending Capital of the House Vendor ($1000) does not exceed the Investment Capital of the House Vendor ($1050) even though there was a 7.14% markup (i.e., 100×(1125−1050)/1050) for the item(s) of the example of FIG. 6.

The scope of the present invention includes cases in which any one of $\Phi_{P,0}$ and $\Phi_{H,0}$ is positive such that a remaining other of $\Phi_{P,0}$ and $\Phi_{H,0}$ is not positive. The scope of the present invention also includes cases in both $\Phi_{P,0}$ and $\Phi_{H,0}$ are positive If the game of uncertain outcome is said to relate to a positive sum game, without reference to an outside vendor or a house vendor, then it is understood herein that the game of uncertain outcome is a positive sum game in relation to either an outside vendor or a house vendor.

Conventional games of chance are generally either negative sum games or zero-sum games, in favor of the house 30 over the player 20; e.g., the game is profitable for the house 30 and unprofitable for the player 20 for both negative sum games and zero-sum games. Note, however, that although the game of uncertain outcome of the present invention may be a positive-sum game as defined supra, the scope of the present invention also includes cases in which the game of uncertain outcome is a zero-sum game or a negative sum game.

Various special cases within the scope of the present invention include: $E^{S\rightarrow I}_i$ constant and thus independent of i, $E^{S\rightarrow C}_i$ is constant and thus independent of i, both $E^{S\rightarrow I}_i$ and $E^{S\rightarrow C}_i$ are constant and thus independent of i, $E^{S\rightarrow I}_i=1$, $E^{S\rightarrow C}_i=1$, N=0, N=1, and N>1.

The entrance-exchange structure 10 may be configured such that the house 30 guarantees that the player 20 cannot lose more than P percent of the initial betting capital of the player 20. This means that if the player 20 converts substantially all of the initial betting capital of the player 20 into relevant scrip by playing one or more games of chance, then the house 30 permits the player 20 to exchange said relevant scrip of the player 20 into (100-P) percent of the initial betting capital of the player 20. Generally, P is any discrete integer, rational, or irrational value in arange of P<100 (e.g., P=1, 2, . . . , 50, 51, . . . , or 99; P=15.40; P=35.6666666. . . , etc.). Thus P can be constrained to any range $P_1<P<P_2$ subject to $P_2<100$ As an example, P can be constrained to 0<P<1, 0<P<2, . . . , 0<P<50,0<P<51. . . , or 0<P<100. As another example, P can be constrained to 10<P<20, 10<P<30, . . . , or 0<P<90). As still another example, P can be constrained to 10.25<P<33.3333333. . . . Other examples include 0≦P<100, −30≦P≦−10, etc.

Alternatively, the entrance-exchange structure 10 may be configured such that the house 30 guarantees that the player 20 cannot come away from the betting with less $F_1B$ units of cash and $F_2B$ units of relevant scrip, wherein B is the initial betting capital of the player 20, and $F_1$ and $F_2$ are real numbers such that $F_1≦0$ and $F_2≦0$. As an example, if B=$1000, $F_1=0.20$, and $F_2=0.40$, then with an initial betting capital of $1000, the player 20 cannot come away from the betting with less than $200 in cash and 400 v in relevant scrip.

The case of P=0 corresponds to a guarantee by the house 30 that the player 20 cannot lose any of the initial betting capital of the player 20. The case of P<0 corresponds to the house 30 guaranteeing that the initial betting capital of player 20 must increase by at least −P percent as a result of playing the game of uncertain outcome. As an example if P=−10, then the house is guaranteeing that the initial betting capital of player 20 the player must increase by at least 10 percent as a result of playing the game of uncertain outcome. Note that for the case of P<0, one may introduce the variable Q=−P whereby Q>0.

While the embodiments described supra relate to a game of uncertain outcome, the scope of the present invention generally comprises an activity of uncertain outcome, wherein an "activity" is a set of rules used to classify, guide, affect or control, an action or series of actions. In conjunction with an "activity," the following definitions, explanations, and examples are relevant to the scope of the present invention. An "outcome" is a result or effect of the activity at a specific time or condition. A "game" is a particular embodiment of an activity, namely an activity with at least one potential outcome (e.g., a win by a player of the game). Example of games include games of chance, a games of skill, etc. A "game transaction" is any aspect or part of a game that has an outcome. A "subject" is anything that can be said to act or be acted upon. A "participant" is a subject acting, or being acted upon, in accordance with an activity. "Entrance" in relation to an activity occurs when a subject becomes a participant in the activity. Examples of an entrance include, inter alia, a placing of a bet, a payment of a fee, an action such as an action that satisfies one or more criteria (e.g., running a race in which the runner must satisfy a criterion of weighing less than 150 pounds; completing an entry form). The action may be a predetermined action, and the criteria may be predetermined criteria. "Entering" into an activity is performing an entrance into the activity. A "player" is a participant in a game, wherein the player may make one or more decisions potentially affecting at least one outcome of the game or entrance into the game. Even a decision to enter and watch may make one a player (e.g., in a lottery). A player is an example of a participant. A participant or subject generally, or a player in particular, may comprise, inter alia, a person, an organization, etc. "Playing" a game is being a participant in the game and potentially affecting or having an interest in an outcome of the game. "Participating" by a subject is acting by the subject, or the subject being acted upon, in accordance with an activity. A "house" acts upon an activity, wherein "acts " comprises at least one of: measures, judges, enforces, controls, creates, manages, administrates and executes. Thus the embodiments of the present invention for a game with one or more players, as described infra, are generalizable to an activity with one or more participants such that the one or more participants may enter the activity. "Takehome" is the actual amount of currency received from a game after subtracting all commissions, fees and payments owed by a player from entering and playing the game. An "expected net payoff" is an amount of currency equal to the probability of a specific outcome of a game transaction, multiplied by the payment potentially received upon achieving that outcome, summed over all possible outcomes and game transactions, and subtracting all commissions, fees and payments owed from playing the game.

If the relevant scrip becomes sufficiently circulated within a "geographical area", such as, inter alia, within a "real geographical area" (e.g., a geographical area with conventional geographical boundaries such as all of the United States, North America, the state of New York, all of the United Nations countries, etc.) or within a "virtual geographical area" such as within a group of persons (e.g., within a corporation, an industry, an organization, a database or list such as a mailing list, etc.), then the relevant scrip may become generally valuable as a virtual currency and may be convertible to cash at a market scrip-cash exchange rate $R^{S\rightarrow C}$ such that each unit of relevant scrip converts to $R^{S\rightarrow C}$ dollars of cash. Conversely, cash may be convertible to relevant scrip at a market cash-scrip exchange rate $R^{C\rightarrow S}$ such that each dollar of cash converts to $R^{C\rightarrow S}$ units of relevant scrip. $R^{S\rightarrow C}$ and $R^{C\rightarrow S}$ is a function of the type of cash (e.g., American dollar, American cent, Japanese yen, English pound, etc.).

Theoretically, $R^{S\rightarrow C}\times R^{C\rightarrow S}=1$. In practice, however, persons or businesses (e.g., banks) may perform such conversions at a profit for themselves such that $R^{S\rightarrow C}\times R^{C\rightarrow S}<1$. Alternatively, $R^{S\rightarrow C}\times R^{C\rightarrow S}>1$ is possible for various reasons including, inter alia: a time delay between a first location and a second location in synchronizing $R^{S\rightarrow C}$ and/or $R^{C\rightarrow S}$ to consistent values at the first location and the second location; labor or other valuable consideration built into $R^{S\rightarrow C}$ and/or $R^{C\rightarrow S}$; adding interest or other inducement(s) to motivate one to acquire a particular relevant scrip or other currency; etc.

The scope of a virtual currency system of the present invention includes multiple currencies denoted as K currencies $C_1, C_2, \ldots, C_K$ such that $K\geqq 1$. If K=1 then only one currency $C_1$ is relevant. If $K\geqq 2$ then at least two currencies are relevant. At least one of $C_1, C_2, \ldots, C_K$ may be a scrip currency (e.g., non-bettable scrip, absolutely bettable scrip, conditionally bettable scrip, etc.). At least one of $C_1, C_2, \ldots, C_K$ may be money. Money is defined herein as a cash (e.g., American dollar, American cent, Japanese yen, English pound, etc.) or a cash. equivalent (e.g., gaming tokens, chips). Each such currency $C_k$ (k=1, 2, . . . , K) may be converted from the other currencies in accordance with an exchange rate matrix [R] of order K such that $$C_j=\Sigma_k(R_{jk}C_k) \quad (1)$$

wherein $R_{jk}$ denote the matrix elements of [R] such that indices j and k each vary from 1 to K, and wherein $\Sigma_k$ denotes a summation over k from k=1 to k=K. The matrix element $R_{jk}$ denote an exchange rate from currency $C_k$ to currency $C_j$. Some currency exchanges may be forbidden (i.e., $R_{jk}=0$ for said forbidden currency exchanges). For example, the diagonal matrix elements may each equal zero (i.e., $R_{kk}=0$ for k=1, 2, . . . , K) if transformations of a currency into itself is forbidden. As another example, if $C_1$ represents a bettable scrip and if $C_2$ represents a dollar currency then the constraint of $R_{21}=0$ may be imposed to exclude the possibility of converting the bettable scrip into the dollar currency. A simple example of the virtually currency system of the present invention is the previously discussed $R^{S\rightarrow C}$ and $R^{C\rightarrow S}$ currency exchanges such that: K=2, $C_1$ represents a cash currency, $C_2$ represents a scrip currency, $R_{11}=R_{22}=0$, $R_{12}=R^{S\rightarrow C}$, and $R_{21}=R^{S\rightarrow C}$.

Since the relevant scrip may emerge into circulation from execution of the entrance-exchange exchange structure 10, the entrance-exchange structure 10 is a source or generator of the relevant scrip or virtual currency. Alternatively, the relevant scrip may be generated by a source other than from execution of the entrance-exchange structure 10. For example, the relevant scrip may be manufactured by the house or by an outside vendor and circulated outside of the entrance -exchange exchange structure 10. Thus, the relevant scrip may be generated wholly or in part by the entrance-exchange structure 10.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

We claim:

1. A computer casino implementing a virtual currency system, comprising:

scrip, wherein the scrip is a virtual currency that is redeemable at a vendor; and money;

wherein the money is at least one of cash and cash equivalent;

wherein the scrip is generated wholly or in part by a computer casino;

wherein the computer casino is configured to manage a game of uncertain outcome adapted to be played by a player;

wherein the computer casino is adapted to pay the player a takehome in a currency for a win of the game of uncertain outcome by the player based on betting by the player;

wherein the player interacts with the computer casino over a data communication medium that is directly connected to the computer casino;

wherein the takehome is the actual amount of the currency received from the game of uncertain outcome owed to the player from entering the game of uncertain outcome;

wherein the amount of scrip in the takehome relates to a limiting scrip takehome and an initial betting capital, the scrip used to purchase items offered for sale by an outside vendor at a scrip-to-items exchange rate that is a dollar value of 1 unit of scrip when the scrip is used to purchase items offered for sale by the outside vendor at a retail value;

wherein the currency is cash plus scrip, and wherein the computer casino only pays the player the scrip each time the player wins the game of uncertain outcome; and wherein the total market value of the take home currency provided to the players by the computer casino is greater than or equal to the total market value of currency bet by the players of the game of uncertain outcome.

2. The computer casino implementing a virtual currency system of claim 1:

wherein at least one vendor exists such that the at least one vendor is selected from the group consisting of a house vendor, an outside vendor, and the house vendor plus the outside vendor;

wherein if the at least one vendor includes the house vendor, then a player may exchange a portion of the scrip at a scrip-to-items exchange rate for at least one item provided by the house vendor; and wherein if the at least one vendor includes the outside vendor, then:

the player may exchange the scrip with the outside vendor at a scrip-to-items exchange rate for at least one item provided by the outside vendor; and the outside vendor may exchange the scrip with the computer casino for cash at the scrip-to-cash exchange rate.

3. The computer casino implementing a virtual currency system of claim 1, wherein the scrip circulates within a geographical area.

4. The computer casino implementing a virtual currency system of claim 3, wherein the geographical area comprises a real geographical area.

5. The computer casino implementing a virtual currency system of claim 3, wherein the geographical area comprises a virtual geographical area.

6. The computer casino implementing a virtual currency system of claim 1, wherein:

the scrip is convertible to cash at a market scrip-cash exchange rate such that each unit of scrip converts to dollars of cash based on the market scrip-cash exchange rate;

cash is convertible to scrip at a market cash-scrip exchange rate such that each dollar of cash converts to units of scrip based on the market cash-scrip exchange rate; or a combination thereof.

7. The computer casino implementing a virtual currency system of claim 6, wherein the scrip-cash exchange rate multiplied by the cash-scrip exchange rate is equal to 1.

8. The computer casino implementing a virtual currency system of claim 6, wherein the scrip-cash exchange rate multiplied by the cash-scrip exchange rate is less than 1.

9. The computer casino implementing a virtual currency system of claim 6, wherein the scrip-cash exchange rate multiplied by the cash-scrip exchange rate is greater than 1.

10. The computer casino implementing a virtual currency system of claim 1:

wherein the virtual currency system comprises a currency;

wherein the currency includes the scrip;

wherein the currency is convertible into a second currency in accordance with an exchange rate matrix.

* * * * *

UNITED STATES PATENT AND TRADEMARK OFFICE

CERTIFICATE OF CORRECTION

PATENT NO. : 7,887,411 B2
APPLICATION NO. : 11/264054
DATED : February 15, 2011
INVENTOR(S) : Keith A. Raniere It is certified that error appears in the above-identified patent and that said Letters Patent is hereby corrected as shown below:

in column 15, line 60, the formula "$R_{21}=R^{S\rightarrow C}$" should read -- $R_{21}=R^{C\rightarrow S}$ --

Signed and Sealed this
Twelfth Day of April, 2011

David J. Kappos

*Director of the United States Patent and Trademark Office*